(12) United States Patent
Vladimerou et al.

(10) Patent No.: US 11,282,387 B2
(45) Date of Patent: Mar. 22, 2022

(54) APPARATUS AND METHOD FOR EXTENDED FORWARD COLLISION WARNING

(71) Applicant: TOYOTA MOTOR ENGINEERING & MANUFACTURING NORTH AMERICA, INC., Plano, TX (US)

(72) Inventors: Vladimeros Vladimerou, Whitmore Lake, MI (US); Derek Stanley Caveney, Plymouth, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 48 days.

(21) Appl. No.: 16/801,634

(22) Filed: Feb. 26, 2020

(65) Prior Publication Data

US 2021/0264788 A1 Aug. 26, 2021

(51) Int. Cl.
*G08G 1/16* (2006.01)
(52) U.S. Cl.
CPC .............. *G08G 1/163* (2013.01); *G08G 1/166* (2013.01); *G08G 1/167* (2013.01)
(58) Field of Classification Search
CPC ......... G08G 1/163; G08G 1/166; G08G 1/167
See application file for complete search history.

(56) References Cited

U.S. PATENT DOCUMENTS

| 9,908,468 | B2 | 3/2018 | Vladimerou et al. |
| 2014/0005906 | A1* | 1/2014 | Pandita ................. B60W 40/04 701/96 |
| 2017/0197549 | A1* | 7/2017 | Vladimerou ........... B60Q 9/008 |
| 2017/0369062 | A1* | 12/2017 | Saigusa ................. B60W 30/16 |

\* cited by examiner

*Primary Examiner* — Sisay Yacob
(74) *Attorney, Agent, or Firm* — Oblon, McClelland, Maier & Neustadt, L.L.P.

(57) ABSTRACT

A method and system generates a collision warning to a driver of a host vehicle. The system includes an on-board sensor of the host vehicle to detect presence of a preceding vehicle, wireless communication circuitry to establish wireless communication with a remote vehicle, and processing circuitry to detect existence of a slow remote vehicle ahead of the host vehicle, track an immediately preceding vehicle ahead of the host vehicle, confirm that the slow remote vehicle is affecting the host vehicle's lane speed of traffic by detecting that the immediately preceding vehicle is decelerating. When it is determined that, that the remote vehicle is sow, display an information message indicating the existence of the slow remote vehicle, and output, when the remote vehicle is slow and the preceding vehicle is decelerating, the collision warning as an audio sound and a visual message.

20 Claims, 9 Drawing Sheets

APPARATUS AND METHOD FOR EXTENDED FORWARD COLLISION WARNING

BACKGROUND

Technical Field

The present disclosure relates generally to the field of vehicle communication systems and a mechanism of providing reliable collision warnings to a vehicle.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicles include brake lights that turn on when a vehicle's brakes are applied by the driver. The brake lights serve as a mechanism to warn other drivers behind the vehicle as to when the vehicle is slowing down, so that the other drivers may also slowdown in order to avoid a collision with the vehicle.

However, in dense traffic conditions where there are other remote vehicles ahead of a vehicle that is being followed. Dense traffic conditions can include stop and go conditions due to operation changes in remote vehicles that are not clearly visible to the driver and the driver may not be aware of the operation changes. In such cases, the driver may depend on the brake lights of the vehicle being followed as the sole indication of the traffic conditions. Further, there are some cases where brake lights are insufficient for warning other drivers that the vehicle is slowing down. For instance, a driver in a rear vehicle may be unable to see break lights of a vehicle that is in front of the vehicle that is being followed. If the vehicles are traversing a sharp turn the driver of the rear vehicle may be unable to see the front vehicle's brake lights and may therefore not be warned in a timely manner. Additionally, weather conditions such as fog, heavy rain, and/or heavy snow may limit the transmission range of the brake lights. Further, the brake lights may malfunction, and/or the driver of the rear vehicle may simply not be paying attention to the front vehicle's brake lights. Such situations may prove to be potentially harmful to the driver of vehicle.

In the present disclosure, references are made to the terms 'host vehicle', 'preceding vehicle' and 'remote vehicle'. In aspects of the present disclosure, a preceding vehicle is intended to mean a vehicle that is traveling on a given roadway, immediately in front of the host vehicle, whereas a remote vehicle is intended to mean a vehicle that is traveling farther ahead of the host vehicle (and the preceding vehicle) on the roadway. Further, in the present disclosure, the host vehicle is labeled as 'HV', the preceding vehicle is labeled as 'PV', and the remote vehicle is labeled as 'RV'.

Adaptive cruise control mechanisms are used to maintain a desired cruising velocity of a vehicle (HV) to maintain a safe distance from a preceding vehicle (PV). However, in dense traffic, the preceding vehicle (PV) may undergo considerable velocity changes, necessitating similar velocity changes in the vehicle (HV). Emergency electronic brake light is another mechanism used to warn the driver of a vehicle (HV) of imminent collision. However, these mechanisms typically detect only the case of the preceding vehicle braking hard, thereby not reacting to remote vehicles (RV) that are at significantly slow speeds already. Thus, the above stated collision avoidance mechanisms provide an uncomfortable, or dangerous, experience for the driver of the vehicle in some cases.

Accordingly, there is a need for a technique that enables warning the driver of the vehicle about an imminent collision in a time effective manner, wherein the driver of the vehicle may comfortably slow down to avoid collisions.

SUMMARY

In an exemplary embodiment, a method of generating a collision warning to a driver of a host vehicle, the method includes detecting existence of a slow remote vehicle ahead of the host vehicle; tracking an immediately preceding vehicle ahead of the host vehicle; confirming that the slow remote vehicle is affecting the host vehicle's lane speed of traffic by detecting that the immediately preceding vehicle is decelerating; displaying, when the slow remote vehicle is detected and the immediately preceding vehicle is being tracked, an information message indicating the existence of the slow remote vehicle; and outputting, when both the slow remote vehicle is detected and the immediately preceding vehicle is decelerating, the collision warning as an audio sound and a visual message.

In an exemplary embodiment, a system for generating a collision warning to a driver of a host vehicle includes an on-board sensor of the host vehicle to detect presence of a preceding vehicle; wireless communication circuitry to establish wireless communication with a remote vehicle; processing circuitry to detect existence of a slow remote vehicle ahead of the host vehicle; track an immediately preceding vehicle ahead of the host vehicle; confirm that the slow remote vehicle is affecting the host vehicle's lane speed of traffic by detecting that the immediately preceding vehicle is decelerating; display, when the slow remote vehicle is detected and the immediately preceding vehicle is being tracked, an information message indicating the existence of the slow remote vehicle; and output, when both the slow remote vehicle is detected and the immediately preceding vehicle is decelerating, the collision warning as an audio sound and a visual message.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
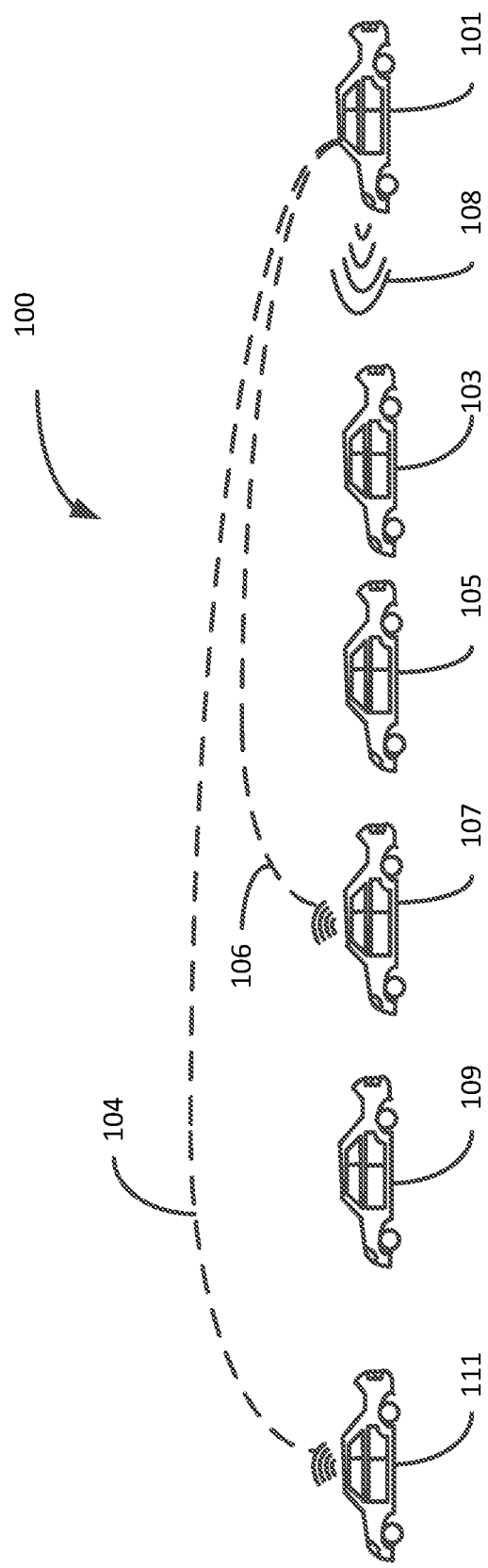
FIG. 1 illustrates an extended forward collision warning system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by appended claims.

Aspects of this disclosure are directed to a configuration in which communication is established between a remote vehicle (RV) and the subject vehicle (HV), while the status of the preceding vehicle (PV) is determined based on sensors (e.g., camera) of the subject vehicle (HV).

Turning now to FIG. 1, is illustrated according to one embodiment, an extended forward collision warning (E-FCW) system 100. The E-FCW system 100 as illustrated in FIG. 1 includes a host vehicle (HV) 101 traversing behind a vehicle 103. The vehicle 103 is a preceding vehicle (PV). Vehicles 105, 107, 109, and 111 are remote vehicles (RV) that are traversing in front of the preceding vehicle (PV) 103. For the sake of illustration, all remote vehicles (RV) 105, 107, 109, and 111 are depicted as traversing in the same lane (i.e., a straight line) as the host vehicle (HV) 101.

According to one embodiment, the host vehicle (HV) 101 includes an electronic control unit (ECU) (also referred to herein as an embedded computer unit, and described later with reference to FIG. 2) that controls one or more electrical systems or sub-systems in a vehicle. The ECU is configured to receive data from on-board sensors and further perform the required computations to warn the driver of the host vehicle (HV) 101 of an imminent collision. By one embodiment, the host vehicle (HV) 101 utilizes line-of-sight sensors and non-line-of-sight sensors to provide a warning to the driver of the host vehicle (HV) 101 in a timely manner.

The host vehicle (HV) 101 includes a radar sensor that utilizes radio waves 108 to detect objects and determine the object's position and velocity. As shown in FIG. 1, the radio waves 108 are utilized to detect and track the movement of the preceding vehicle (PV) 103. The radar included in the host vehicle (HV) 101 may be long range radar with a narrow field of view, a mid-range radar, or a short range radar having a wider field of view. Additionally, the host vehicle (HV) 101 may also be equipped with a camera to track the preceding vehicle (PV) 103. The camera may be integrated into a monocular or stereo configuration. Monocular cameras have a field of view of in the range 50 degree to 60 degree and a range of 100-200 meters. Stereo cameras on the other hand accomplish the same task as the mono cameras but provide greater reliability. Furthermore, the host vehicle (HV) 101 may also include a light detection and ranging (LIDAR) sensor that can be utilized to track the preceding vehicle (PV) 103. Accordingly, in the present embodiment, the host vehicle (HV) 101 tracks the immediately preceding vehicle (PV) 103 by using at least one of the radar sensor, LIDAR sensor and the camera.

The host vehicle (HV) 101 further includes non-line of sight sensors such as a dedicated short range communication sensor (DSRC), cellular sensor, and the like, to identify remote vehicles (RV) travelling in the same lane as the host vehicle (HV) (also referred to herein as an 'ego' lane, i.e., the road lane in which the host vehicle traverses). As shown in FIG. 1, the host vehicle (HV) 101 utilizes non-line of sight sensors to identify remote vehicles (RV) 111 and 107 that are traveling in the ego lane at a substantially lower speed than the host vehicle (HV) 101. The remote vehicles (RV) 111 and 107 are identified by non-line of sight communication represented as 104 and 106, respectively.

By one embodiment, the host vehicle (HV) 101 identifies remote vehicles (RV) travelling in the ego lane at lower speeds (compared to the host vehicle's current speed) or remote vehicles (RV) that are stopped in the ego lane. Further, by utilizing line of sight sensors, the host vehicle (HV) 101 tracks the preceding vehicle 103 and anticipates the motion of the preceding vehicle (PV) 103 based on the determination of the remote vehicle's motion. Accordingly, based on the above stated identification and tracking performed by the host vehicle (HV), the ECU in the host vehicle (HV) 101 warns the driver to either comfortably slow down or brake immediately in order to avoid collisions. In some embodiments, the ECU displays a message informing that a RV is traveling considerably slower than highway speeds on the same road, for example less than 20 mph. The ECU displays an urgent warning as well as provides an audible warning when such a slow RV is detected and the PV appears to be decelerating. The ECU displays a warning when a RV in an adjacent lane is slow and the PV is slowing.

Figure 2:
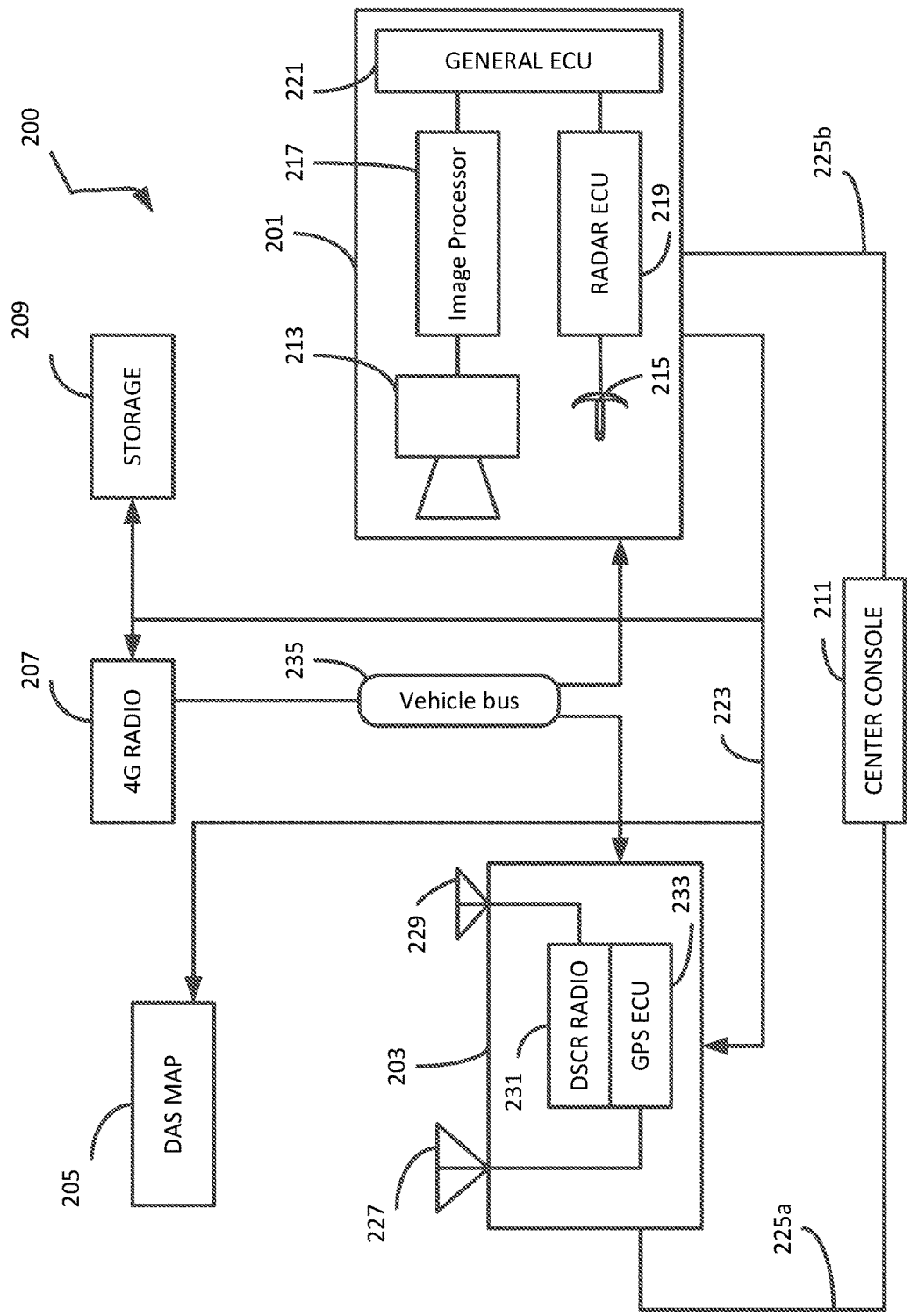
FIG. 2 is a hardware block diagram of a control system included in a vehicle in accordance with an exemplary aspect of the disclosure.

FIG. 2 illustrates according to one embodiment, a hardware block diagram of an embedded control system 200 included in the host vehicle (HV) 101 of FIG. 1. The embedded control system 200 includes an electronic subsystem-I, 201, and an electronic subsystem-II, 203, which are coupled together by an electronic bus 223. The subsystems 201 and 203 include embedded control units (ECUs)

i.e., processing circuits (described later with reference to FIG. 9) that control one or more electrical system or subsystems in the vehicle.

The ECUs receive data from on-board sensors and perform information processing operations as well as distribution of instructions to various in-vehicle systems. It must be appreciated that each ECU can work in an independent manner, wherein the ECU operates its own firmware. However, the ECU's may cooperate with one another to solve complex processing operations.

The subsystem 201 includes a camera 213 and a line of sight sensor-radar 215 that are coupled respectively to an image processor 217 and radar ECU 219. The radar 215 utilizes radio waves to detect a vehicle and determine the detected vehicles speed. The radar 215 may be a long range radar with a narrow field of view, a mid-range radar, or a short range radar having a wider field of view. The camera 213 may be used to track a preceding vehicle (PV). As stated previously, the camera may be a monocular or a stereo type camera. The image processor 217 and the radar ECU 219 are coupled to an on-board ECU 221 that may be configured to process the combined information received from the camera 213 and the radar 215.

The subsystem 203 includes a GPS antenna 227 coupled to a GPS ECU module 233. The data obtained from GPS can be used to determine several valuable pieces of information, including how far a vehicle has traveled, how long it has been traveling, its current and average speeds, and its estimated time of arrival at the destination. Further, the subsystem 203 further includes a non-line-of-sight sensor such as a dedicated short range communication sensor (DSRC) that may operate in the 5.9 GHz spectrum. For instance, as shown in FIG. 2, the subsystem 203 includes a DSRC antenna 229 that is coupled to a DSRC radio 231.

The subsystems 201 and 203 are coupled together via a serial bus 223. The serial bus 223 may be a controller area network (CAN) type of serial bus that allows ECUs to communicate with each other within a vehicle. Additionally, the CAN may be a low-speed CAN (ISO 11519) that offers data transfer rates of up to 125 Kbps, or alternatively the CAN may be a high-speed CAN (ISO 11898) that achieves data rates up to 1 Mbps. It must appreciated that the serial bus 223 may also be a local interconnect network (LIN) or a FlexRay type of serial bus that offers two 10 Mbps data channels.

By one embodiment, the subsystems 201 and 203 may be coupled to a vehicle bus 235 that provides Ethernet connections to different modules included in the vehicle system such as a 4G radio 207. Additionally, the subsystems 201 and 203 may communicate via the serial bus 223 to a driver assistance system (DAS) map that provides information such as road curvature, number of lanes in the road and the like. Moreover the system 200 as depicted FIG. 2 includes storage (memory) 209, wherein information processed by the ECUs may be stored. For instance, as described later, the host vehicle (HV) may maintain a queue of remote vehicles (RVs) that are currently being tracked by the host vehicle (HV). Such tracking information may be stored in the memory 209. Further, the subsystems 201 and 203 may be coupled to a center console unit 211 via a digital I/O interface. The center console 211 includes a display panel and a speaker that may be utilized in providing audio-visual warning messages to the driver of the vehicle. Accordingly, as described next, the host vehicle (HV) incorporates both line of sight sensors and non-line of sight sensors to issue collision warnings to the driver of a vehicle.

Figure 3:
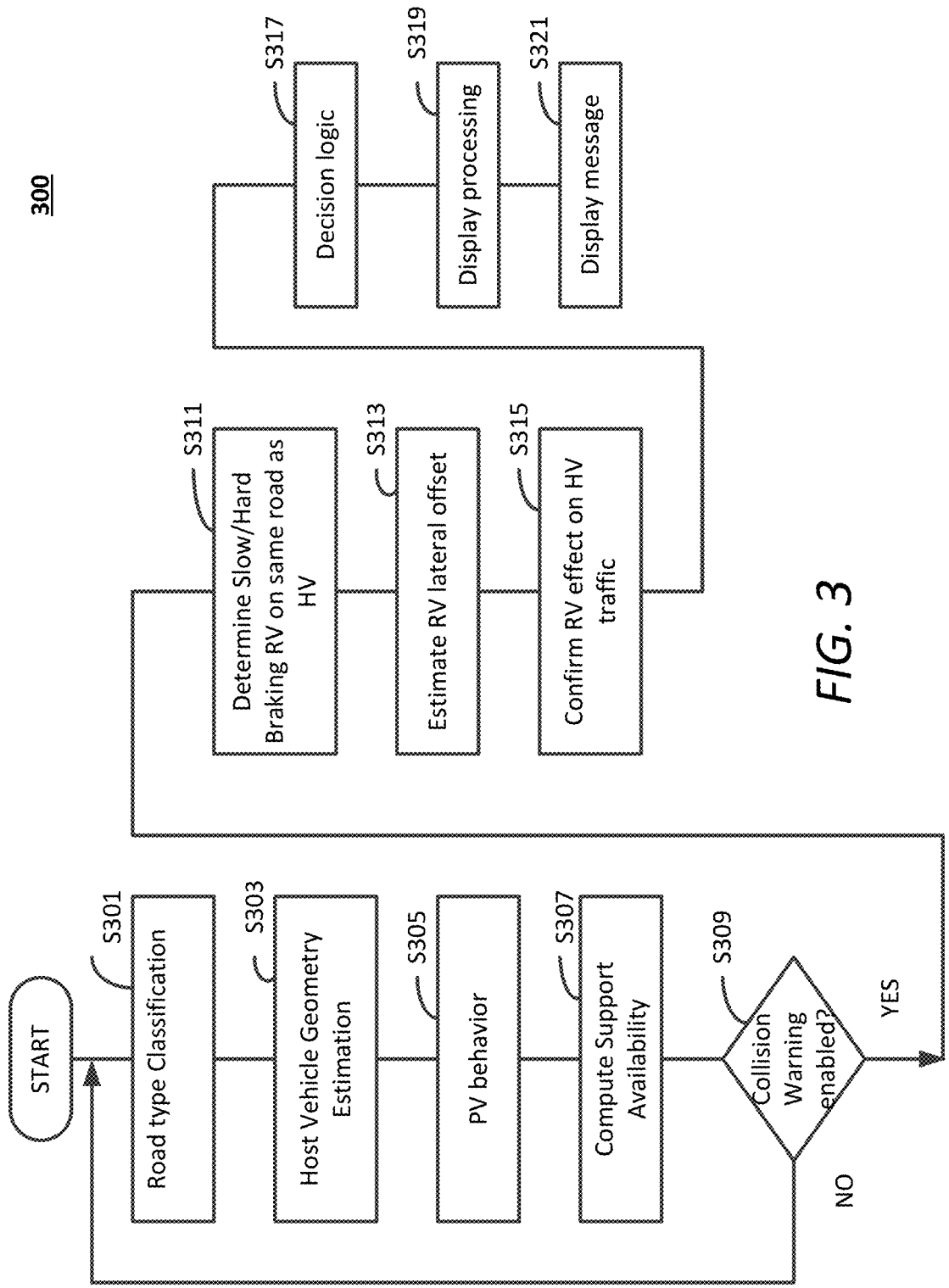
FIG. 3 is a flowchart of the steps performed by the extended forward collision warning system in accordance with an exemplary aspect of the disclosure.

FIG. 3 depicts a flowchart 300 illustrating the steps that may be performed by the E-FCW system. Although the steps in the flowchart are shown in a certain order, the order of the steps is not limited to this ordering. Also, some steps may be performed in parallel. For example, PV behavior may be performed in reverse order, or in parallel with, the HV road geometry estimation. The process 300 commences in step S301, wherein the E-FCW system determines a type of road on which the host vehicle is traversing. According to one embodiment, the host vehicle (HV) utilizes the line of sight sensors to determine the type of the road. Specifically, the host vehicle (HV) utilizes the line of sight sensors to determine whether the road on which the host vehicle (HV) is currently traversing is a 'divided highway'.

By one embodiment, the E-FCW system classifies the road as a divided highway only when the following two conditions are satisfied: (a) a current speed at which the vehicle is travelling (denoted as v(t)) is greater than a predetermined speed threshold (V), and (b) the speed of the vehicle in a certain time window (T) is greater than the predetermined speed threshold. Specifically, for a value of $\tau < T$, the speed of the vehicle (v (t–$\tau$)) is greater than V. By one embodiment, the E-FCW system utilizes the values of V=45 miles per hour (mph) and T=30 seconds (sec) to determine whether the road the vehicle is traversing is a divided highway.

In contrast, the E-FCW system classifies the road type as not being a divided highway, if within a predetermined distance (D) traversed by the host vehicle (HV) (also referred to herein as ego-vehicle) either of the following two conditions are satisfied: (a) oncoming traffic having a longitudinal relative speed (with respect to the ego-vehicle) of at least –5 mph is detected by the ego vehicle, and (b) traffic having a lateral speed of at least 6 mph is detected by the ego-vehicle.

The process 300 then proceeds to step S303, wherein the E-FCW system performs an estimation of geometry of the lane of the road in which the host vehicle (HV) is traversing. According to one embodiment, the E-FCW system also performs a remote vehicle (RV) lane classification. Specifically, the host vehicle (HV) determines whether a remote vehicle (RV) is travelling in the same lane as the host vehicle (HV) or whether the remote vehicle (RV) is traversing on a different lane (on the same road) as compared to the host vehicle's lane. Details pertaining to the host-lane geometry estimation and the remote vehicle (RV) lane classification are described later with reference to FIG. 4 and FIG. 5.]]

Figure 4:
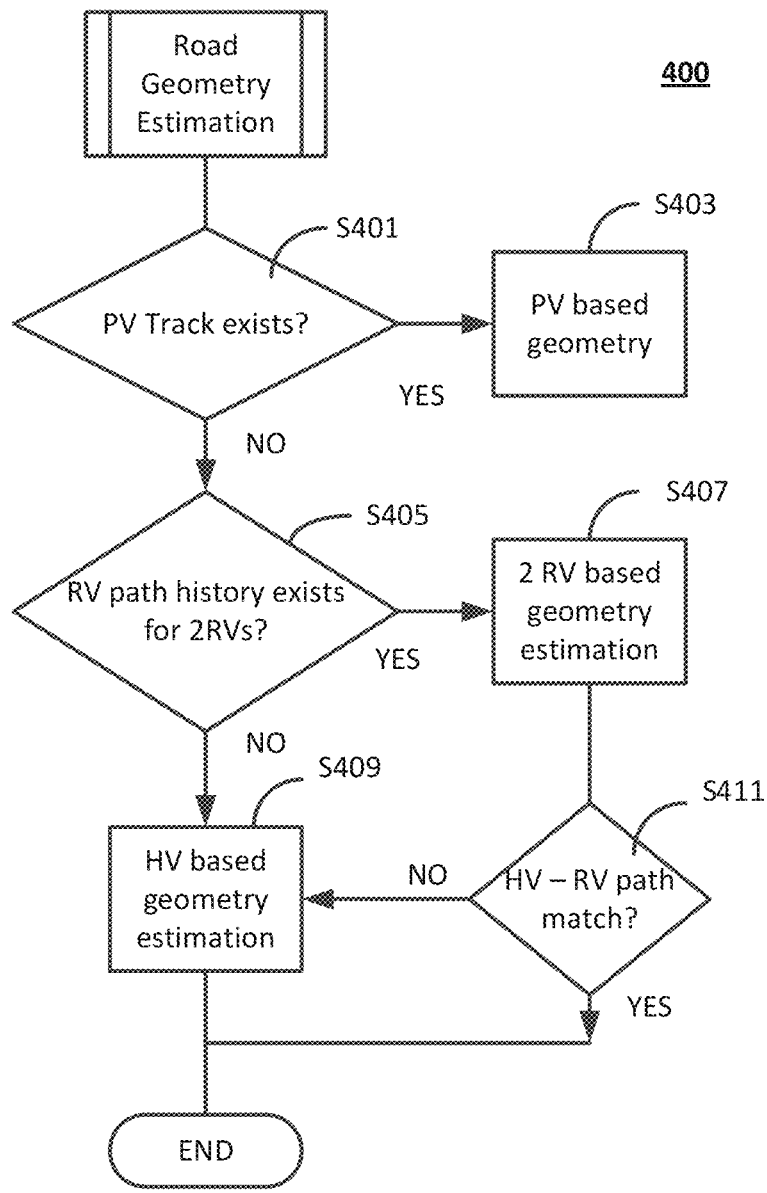
FIG. 4 is a flowchart of the steps performed by a host vehicle to determine the geometry of the road lane in which the host vehicle is traversing in accordance with an exemplary aspect of the disclosure.

Turning to FIG. 4 is depicted a flowchart illustrating the steps performed by a host vehicle to estimate the geometry of the road-lane in which the host vehicle is traversing. According to one embodiment, the host vehicle utilizes a priority mechanism in estimating the geometry of the lane. Specifically, the host vehicle determines, in decreasing order of priority, whether the preceding vehicle's track history is available, whether the remote vehicles track history (along with the host vehicle's predicted path) is available from two remote vehicles, or whether the host vehicle should estimate the geometry of the lane based only on the predicted path of the host vehicle. As shown in FIG. 4, the process of estimating the geometry of the lane commences in step S401, wherein a query is made to determine whether a sufficient track history of the preceding vehicle (PV) exists. Note that the host vehicle receives data corresponding to the track history of the preceding vehicle (PV), for instance, information in the (ASN) 1.0 data packets that are transmitted by the preceding vehicle.

If the response to the query in step S401 is affirmative (YES), the process proceeds to step S403. In step S403, the host vehicle (HV) estimates the geometry of the lane based on the track history information of the preceding vehicle. According to one embodiment, the host vehicle (HV) implements a batch processing technique such as least squares fitting and/or a Kalman filtering based technique to estimate the geometry of the lane. Under the assumption that vehicles do not deviate far from the lane center, the lane geometry estimation based on vehicle path can be performed as a problem of fitting a cubic polynomial to the path history points of the preceding vehicle. Other methods of estimating the geometry of the lane may include Kalman filter/sensor fusion using lane marker recognition as described in U.S. Pat. No. 6,292,752, as well as more complex road models such as the two-clothoid method described in U.S. Pat. No. 6,751,547 B2. Upon performing the estimation of the road geometry (based on the track history information of the preceding vehicle) in step S403, the process in 400 terminates.

However, if the response to the query in step S401 is negative (NO), the process proceeds to step S405. In step S405, a query is made to determine whether the path history of two remote vehicles is available. If the response to the query in step S405 is affirmative (YES), the process moves to step S407. However, if the response to the query is negative (NO), the process moves to step S409.

In step S407, the host vehicle estimates the geometry of the lane based on the track history of two remote vehicles. Details regarding this estimation are described later with reference to FIG. 5. It must be appreciated that while the host vehicle performs the estimation of the road geometry based on the track history of two remote vehicles (S407), the host vehicle also includes the host vehicles predicted path in successfully estimating the road-lane geometry. Specifically, as shown in step S411, a query is made to determine, whether the path obtained based on the path history of the two remote vehicles matches a predicted path of the host vehicle.

If the response to the query in step S411 is affirmative (YES), the process terminates. However, if the response to the query (S411) is negative (NO), the process proceeds to step S409 to perform the estimation of the geometry of the lane based only on the host vehicle's predicted path.

In step S409, the host vehicle performs geometry estimation of the lane based only on the predicted path of the host vehicle. For instance, according to one embodiment, the host vehicle predicts its future path based on a current steering angle of the host vehicle and/or a rate of change of the steering angle. Accordingly, based on the predicted path of the host vehicle, the host vehicle estimates the geometry of the lane in which it is traversing. Upon completing the estimation of the road geometry in step S409, the process 400 as illustrated in FIG. 4 terminates.

Additionally, by one embodiment, in the above described techniques of estimating the geometry of the road lane, the host vehicle may utilize information available from the DAS map (205 of FIG. 2) as well as lane marker recognition information in the steps of S403, S407, and S409, respectively, to estimate the geometry of the lane. By one embodiment, the geometry of the road lane may be estimated using a range sensor, such as a camera having a telephoto lens.

[Lane Geometry—2 RVs]

Figure 5:
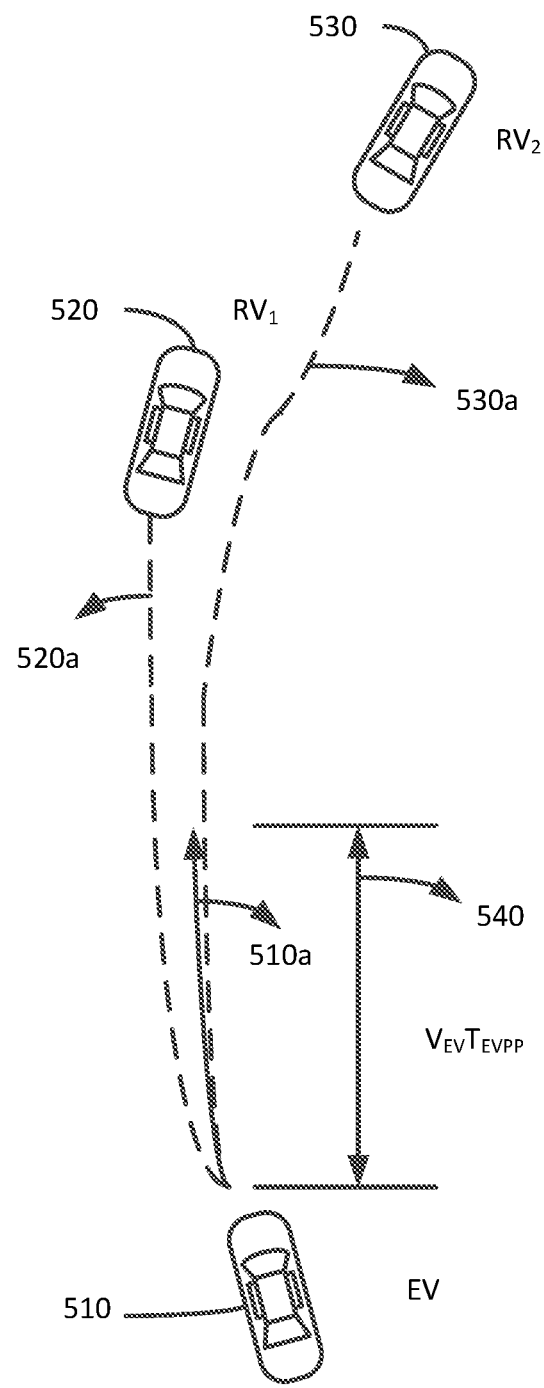
FIG. 5 illustrates a schematic depicting lane estimation based on path history of two remote vehicles in accordance with an exemplary aspect of the disclosure.

Turning to FIG. 5 is illustrated a schematic diagram depicting the lane geometry estimation based on the path histories of two remote vehicles. Specifically, the lane geometry estimation of step S407 of FIG. 4 is described herein with reference to FIG. 5.

FIG. 5 depicts a host vehicle 510 (also referred to herein as an ego-vehicle and represented as EV) that detects two remote vehicles 520 and 530 that are represented as $RV_1$ and $RV_2$, respectively. According to one embodiment, the host vehicle 510 determines the two remote vehicles 520 and 530 to be the remote vehicles that are closest to a slowest moving remote vehicle. Note however, that if only two remote vehicles are detected, both the detected vehicles will be used to estimate the geometry of the lane in which the host vehicle is traversing.

The host vehicle 510 processes and generates the path histories 520a and 530a of the remote vehicles 520 and 530 respectively. Specifically, the remote vehicles 520 and 530 transmit data packets that are processed in the ECU of the host vehicle. Accordingly, the host vehicle 510 processes the data packets and further generates the path histories of the remote vehicles 520 and 530, respectively.

The host vehicle 510 also predicts its future path based on a current steering angle of the host vehicle. In doing so, the host vehicle generates its predicted path that is depicted as path 510a in FIG. 5. Upon generating the predicted path 510a, the host vehicle processes the path histories 520a and 530a of the remote vehicles 520 and 530, respectively, in order to ensure that at least one path history of the remote vehicles is not farther than a half-lane width from the host vehicle's predicted path, over a certain predetermined length 540.

Specifically, the host vehicle performs processing to ensure that at least one of the path histories of the remote vehicles is within half a lane width from the host vehicle's predicted path, over a distance $v_{ev}*T_{evpp}$, wherein the parameter $v$, corresponds to the velocity of the host vehicle and the parameter $T_{evpp}$ is a predetermined time-duration, for example 2 seconds. Accordingly, the host vehicle estimates the geometry of the lane in which it is traversing based on a successful match of at least one of the path history of the remote vehicle to the host vehicle's predicted path.

Additionally, by one embodiment, when the path history of only one remote vehicle (out of the two remote vehicles 520 and 530) is within the half-lane width distance from the host vehicle's predicted path 510a, the host vehicle performs additional processing in estimating the geometry of the lane. For instance, if the path history 520a of the remote vehicle 520 is within the half-lane width distance from the host vehicle's predicted path 510a, the host vehicle 510 performs processing on the path history 530a of the remote vehicle 530, to ensure that the remote vehicle 530 remains at a constant lateral offset from the path of the other remote vehicle. In doing so, the host vehicle 510 determines whether there is a divergence in the paths of the two remote vehicles. For instance, as shown in FIG. 5, the path history for remote vehicle 530 diverges from the path history of remote vehicle 520, thereby indicating that at least one of the two remote vehicles is performing a lane change. Thus, the host vehicle 510 estimates the geometry of the lane in which it is traversing based on a successful matching of the path history of at least one remote vehicle to the host vehicle's predicated path. In the above described processing technique for estimating the geometry of the lane, the lane width can be either assumed to be 10 feet wide, or alternatively, may be estimated based on lane marker information and DAS map (205 in FIG. 2) information. Accordingly, by one embodiment, the geometry of the lane is estimated based on path history of the remote vehicle that is within half lane width of the predicted path of the ego-vehicle. For instance, a least squares fit to the path of the vehicle with the closest offset to the ego-vehicle can be performed to estimate the lane geometry.

In a similar manner, the host vehicle may choose any other priority allocation scheme in assigning the priorities to the remote vehicles. For instance, a remote vehicle may set an event flag in the BSM data packet that is transmitted to the host vehicle. Such a flag may be set for instance, when the remote vehicle is braking hard. The event flag thus serves as an urgent warning mechanism by which the remote vehicles may communicate with the host vehicle. Accordingly, the host vehicle while allocating priority to the remote vehicles may choose to assign a highest priority to a remote vehicle that has set the event flag in the BSM.

[Estimate PV Behavior]

[PV Behavior]

In addition to estimating the geometry of the road ahead using HV path prediction, the path of the PV may also be used to estimate road geometry. An assumption in E-FCW logic may include that the PV follows the geometry of the road ahead. When approaching a curve entry, the HV's current curvature might not describe the road ahead as accurately as the PV path, if that PV has already entered the curve. In some embodiments, the road geometry may be estimated in a manner that takes into account the path of the PV.

Figure 6:
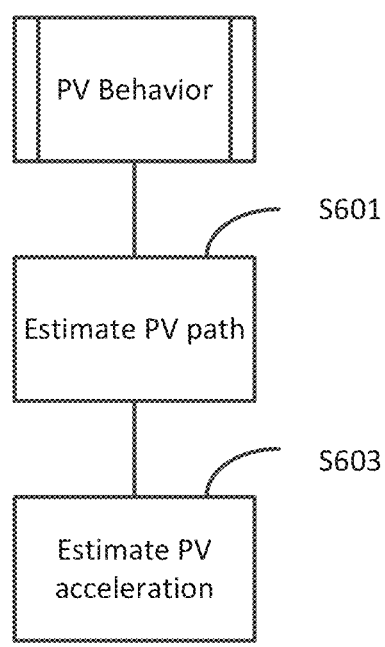
FIG. 6 is a flowchart of the steps performed by the host vehicle to determine the behavior of a preceding vehicle in accordance with an exemplary aspect of the disclosure.

FIG. 6 is a flowchart illustrating the steps of determining PV behavior in accordance with an aspect of the disclosure. In one embodiment, the PV behavior is estimated using two Kalman Filters and a finite difference estimator (also considered a filter). All filters may run on every processing cycle (for example, a 100 ms period). In S601, one filter outputs an estimate of the geometry of the preceding vehicle's (PV) path; in S603, the other filter outputs an estimate of the PV's acceleration. These quantities are estimated on the local HV reference (Cartesian) coordinate system (i.e., a reference frame that moves with the HV).

[Estimate of PV Path]

The first Kalman filter runs on every cycle.

When a PV exists, the first Kalman filter estimates coefficients for an equation describing the PV's path (i.e. PV lateral displacement, y, along the HV heading as a function of x, the PV's longitudinal offset from the HV: $y(x) = c_0 + c_1 x + \frac{1}{2} c_2 x^2 + \frac{1}{6} c_3 x^3$ $C_0, C_1, C_2, C_3$ are parameters for PV path in HV reference frame. $C_0$ represents the lateral offset of PV's path from HV. $C_1$ represents the heading of PV's path at HV. $C_2$ represents a curvature of PV's path at HV. $C_3$ represents a curvature rate of PV's path along HV's longitudinal direction. The first Kalman filter estimates these parameters as the state of the PV.

[Estimate of PV Deceleration]

In addition to the path of the PV, the acceleration of the PV may also be determined. The motion of the preceding vehicle may be used to estimate that the PV is decelerating.

The determination of the PV's acceleration runs on every cycle. Depending on a configuration option the determination uses the second Kalman Filter or finite difference to estimate the PV's absolute acceleration. The second Kalman filter state may include acceleration, velocity of the PV and HV, and a relative position of the PV. The absolute longitudinal speed is calculated from a PV relative speed and an HV speed.

When a PV exists, the filter estimates longitudinal acceleration along HV's current heading. This acceleration may be used to confirm a slow RV's effect on HV-lane traffic and the PV.

By one embodiment of the present disclosure, upon estimating the acceleration of the preceding vehicle (PV), the ECU of the host vehicle issues a warning to the driver of the host vehicle, based on a determination made by the ECU, that the driver of the host vehicle cannot perform all of the following functions: brake comfortably with a rate of deceleration being lower than a predetermine comfortable deceleration rate, brake within a predetermined reaction time, and avoid a collision (or in other words, maintain a predetermined safe distance) with the preceding vehicle by a predetermined safe distance.

[Support Availability]

A support availability function runs on every cycle.

In S307, in every cycle, the ECU decides whether or not to proceed with further RV processing for E-FCW based on 1) Current HV speed; 2) Road type from scene identification; 3) User settings. In one embodiment, further RV processing will be performed if the host vehicle (HV) is traveling on a highway road type. RV processing may also be performed if the host vehicle is traveling greater than a predetermined speed (e.g., 40 mph) and user settings have been configured for performing collision warning processing.

[RV Slow]

If it is determined that collision warning is enabled (YES in S309), the processing continues to S311. In S311, the ECU searches for hard-braking or slow relative-speed RVs within a certain azimuth and having a heading similar to HV heading (within some angle). This step will remove RVs travelling on other roads from further processing.

Figure 7:
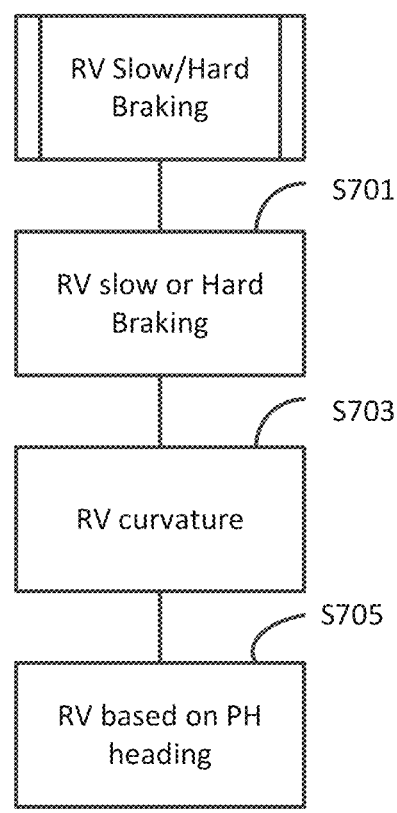
FIG. 7 is a flowchart of the steps performed by the host vehicle to determine slow speed or hard braking of a remote vehicle in accordance with an exemplary aspect of the disclosure.

FIG. 7 is a flowchart illustrating the step of determining RV slow speed or hard braking. This step selects a target set of RVs in accordance with the following three main steps: S701, S703, S705.

From an (fully-verified) RV memory buffer, in step S701, the ECU determines whether there are RVs that are either: hard-braking (i.e., an event flag is set upon detection of appropriate deceleration by the RV); or are slower than the HV by more than a predetermined speed (for example, about 24 m/s i.e. 53 mph), and have absolute azimuth below a predetermined azimuth (for example 30°), have a heading which differs at most by a maximum heading difference from the HV's heading, and are within a maximum range.

The fully verified list of RVs are based on communications with RVs by radio communication. Along with verification, the current speed for each RV in the verified RV list is received by the HV. The ECU performs a procedure to determine the RV longitudinal and lateral offset along the HV's.

From a subset of RVs identified in step S701, in S703, the ECU finds RVs whose path history does not include sharp curves. One assumption is that RVs whose path is a sharp curve are likely to be exiting the highway at an exit ramp.

In one embodiment, an assumption in E-FCW is that any RV with a path history (PH) exhibiting high curvature is currently or has exited the main highway (i.e., travelling on an off-ramp). To avoid false positives for hard-braking or slow vehicles on off-ramps or on surface streets, these RVs are omitted from the subsequent support decision logic (step S317 in FIG. 3).

For purposes of this disclosure, a 'sharp' curve is a curve which when at a predetermined minimum speed, the lateral acceleration required to traverse the curve is greater than maximum on highway. Such 'sharp' curves are assumed to be highway off-ramps. Step S703 adds labels to RVs whose path history does not include "sharp" curves.

The target subset of RVs from step S703 is further reduced by, in S705, the ECU finds those RVs whose heading history is similar to the local HV road geometry (e.g., below a maximum difference between HV and RV heading).

Conversely to step S703, it is also possible that an RV exits the highway on a straight (low-curvature) ramp. Therefore, in one embodiment, the relative heading of the path history is also checked against the estimated road geometry. When the headings do not match, the RV is assumed to have exited the highway or is not within the HV-lane.

In one embodiment, double-lane changing RVs that have PH offsets to the right of the PV and left of the HV (i.e., averaging out to same-lane offset), are detected. In S705, the RV heading is compared to a combination of heading values: the HVs current heading, the HVs predicted heading, the PVs heading at its current position, and the PVs predicted heading. The heading of the RV is then determined based on the extent of the RVs path history, the HV's velocity, and the existence, position and heading of a PV. The target subset of RVs form is further reduced by the ECU finding those RVs whose heading history is similar to the local HV-road geometry.

Relative Remote Vehicle Lane

In S313, both HV and PV path information may be used to estimate lateral offset.

In step S313, the ECU processes the RVs whose heading is within the same road, are slow or hard braking, and are not on a ramp. The ECU computes the lateral offset of the RV path history from the HV-lane. The lateral offset may be computed in multiple locations (similarly to the heading estimation in step S705) and then averaged.

In one embodiment, the lateral offset is approximated as the lateral distance between the RV's PH chord and the current or projected road heading at specific longitudinal offsets along the HV heading.

Step S315 confirms that the RV is indeed on the HV-road (on the HV-lane or an adjacent lane) by using an additional piece of information. The confirmation may be based on two additional pieces of information: (1) the PV is slowing down, and (2) another RV exists with a PH that is parallel to the slow RV's path up to the RV current position.

If the PV never slows down that could mean that: the slow RV is not in the PV lane; the PV is ignoring a slow preceding vehicle in its lane; the PV is changing lanes without slowing down. In one embodiment, E-FCW assumes that the slow RV is not in the PV lane.

It is possible that the PV is slowing down for another reason such as the driver failing to keep a smooth speed. In one embodiment, the E-FCW assumes that given the slow RV, the PV is slowing down most likely because the traffic ahead is slower than its current speed.

In one embodiment, a check is made by the ECU whether or not the PV deceleration value is below a predetermined threshold (for example a number in $m/s^2$).

Furthermore, by one embodiment, the host vehicle performs a process of classifying a lane in which a remote vehicle (RV) is traversing. Specifically, assuming that the host vehicle detects a highway type of road, the host vehicle classifies the remote vehicle as traversing in one of an 'in-lane' remote vehicle (i.e., traversing in the same lane as the host vehicle), and an 'in-road' remote vehicle (i.e., traversing on the same road, but not in the same lane as the host vehicle).

[RV Lane—Same Lane]

The host vehicle classifies the remote vehicle (RV) as a remote vehicle traversing in the same lane as the host vehicle (i.e., in-lane). In some embodiments, the remote vehicle is considered as traversing the same lane as the host vehicle based on the following two conditions being satisfied. The host vehicle (HV) first determines based on the path history of the remote vehicle (RV), whether the remote vehicle is detected to be within a half-lane width across the center of the host vehicle's lane at the following three spatial-time instances: at the remote vehicle's current location, at a location that is half way between the remote vehicle's current location and the location of the preceding vehicle, and at a time instant when the remote vehicle was at the preceding vehicles current location. Furthermore, as a second condition, the host vehicle classifies the remote vehicle as an in-lane remote vehicle based on the remote vehicle's heading angle being within 45° from the host lane's heading along the path history of the remote vehicle.

[RV Lane—Different Lane]

The host vehicle classifies the remote vehicle as an in-road remote vehicle (i.e., a remote vehicle traversing on the same road, but not in the same lane, as the host vehicle) based on the following two conditions being satisfied. The host vehicle first determines based on the path history of the remote vehicle, whether the remote vehicle is detected to be within two-lane widths across the center of the host vehicle's lane at the following three spatial-time instances: at the remote vehicle's current location, at a location that is half way between the remote vehicle's current location and the location of the preceding vehicle, and at a time instant when the remote vehicle was at the preceding vehicles current location and at a time instant when the remote vehicle was at the host vehicle's current location. Furthermore, as a second condition, the host vehicle classifies the remote vehicle as an in-road remote vehicle based on the remote vehicle's heading angle being within 45° from the host lane's heading along the path history of the remote vehicle.

HMI

In step S317, the ECU considers the risk induced by all the RVs that satisfy the following properties: slow or hard braking, not on a ramp, and the heading is within the road. If there is a slow RV, if the PV is slowing down, then the RV is assumed to be in the same lane as the HV.

Figure 8:
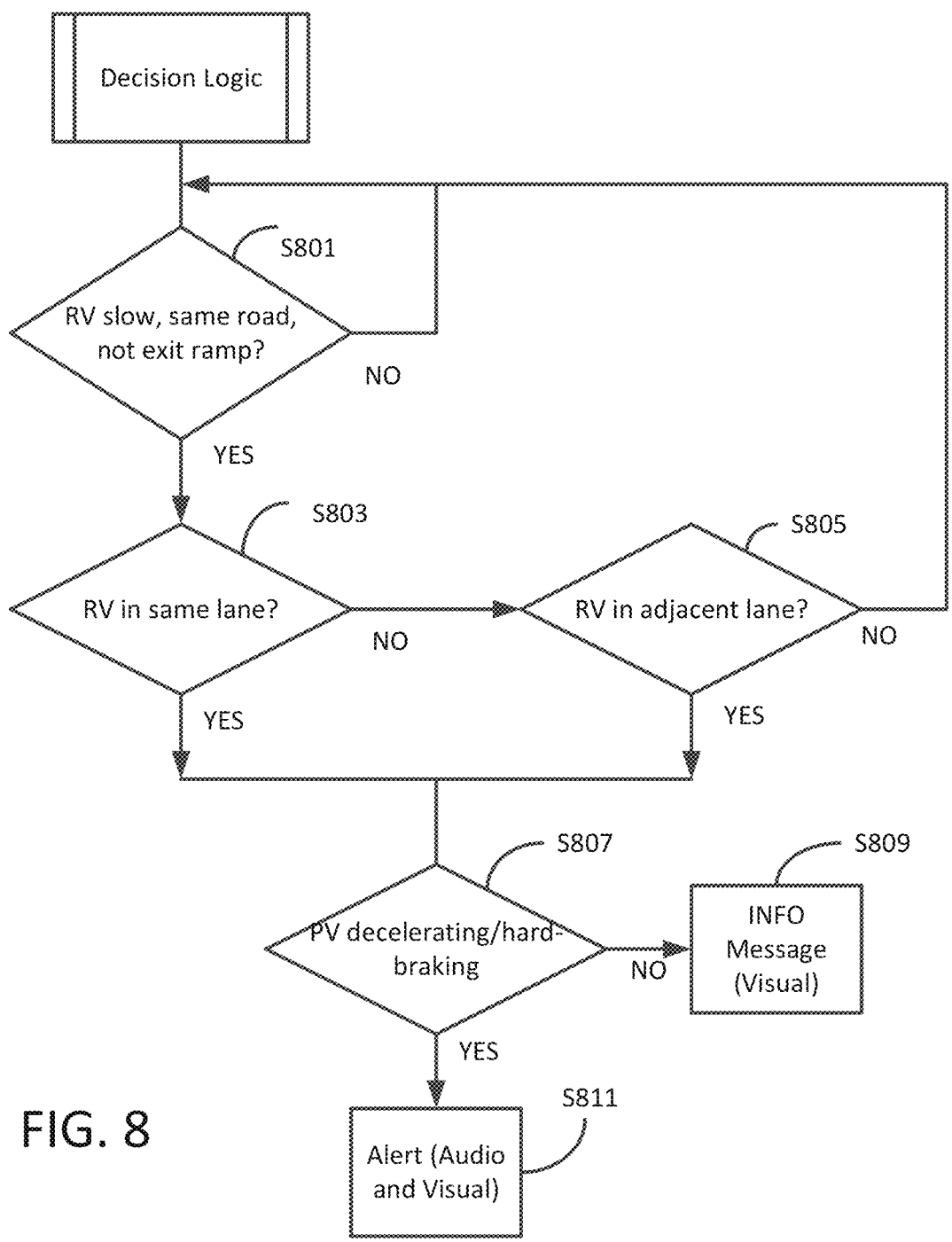
FIG. 8 is a flowchart of the steps performed by the host vehicle of decision logic related to display of warning messages in accordance with an exemplary aspect of the disclosure.

FIG. 8 is a flowchart illustrating the step of performing decision logic. In S801, the ECU determines if the RV is slow, on the same road as the HV, and is not on an exit ramp. When conditions in S801 are met (YES in S801), the ECU determines, in S803, whether the RV is in the same lane as the HV, or in S805, whether the RV is in an adjacent lane (adjacent left or adjacent right). In S807, the ECU determines whether the PV is decelerating. If the RV is in the same lane or an adjacent lane, but the PV is not decelerating (NO in S807), in S809, the ECU displays a visual information message. Otherwise (YES in S807), when the PV is decelerating, in S811, an alert will be presented as an audio and a visual message.

Depending on the RV relative speed E-FCW will (1) support immediately or (2) support based on TTC/safe-following-distance from the PV or RV.

In step S319, the ECU requests HMI from the HMI arbitration block, with hysteresis. The step avoids repeating a false positive as well as avoid repeating true positives that might annoy the driver. In one embodiment, in S319, display processing may be performed immediately when the RV is estimated to be in the HV-lane using step S315.

E-FCW can be elevated from "info" (only visual) to "caution/alert" (visual and audio) at any time. However, unless being elevated, HMI visual information messages are issued only once every predetermined seconds. This is to avoid annoying the driver in case of repeated false positives or in case the driver has received the message but still choosing to drive aggressively.

An audible and visual HMI (separately) warning may be issued by the ECU for a specific duration of time.

Additionally, the ECU by one embodiment, may also issue the warning messages based on either a remote vehicle coming to a halt (i.e., remote vehicle is stopped), or the in-lane remote vehicle's rate of deceleration and/or the in-lane preceding vehicle's rate of deceleration being greater than a predetermined deceleration rate (e.g., deceleration rate corresponding to a scenario of a vehicle braking hard such as an the emergency electronic brake light situation).

[Processing Circuitry]

Each of the functions of the described embodiments may be implemented by one or more processing circuits. A processing circuit includes a programmed processor (for example, processor 903 in FIG. 9), as a processor includes circuitry. A processing circuit also includes devices such as an application-specific integrated circuit (ASIC) and circuit components that are arranged to perform the recited functions.

Figure 9:
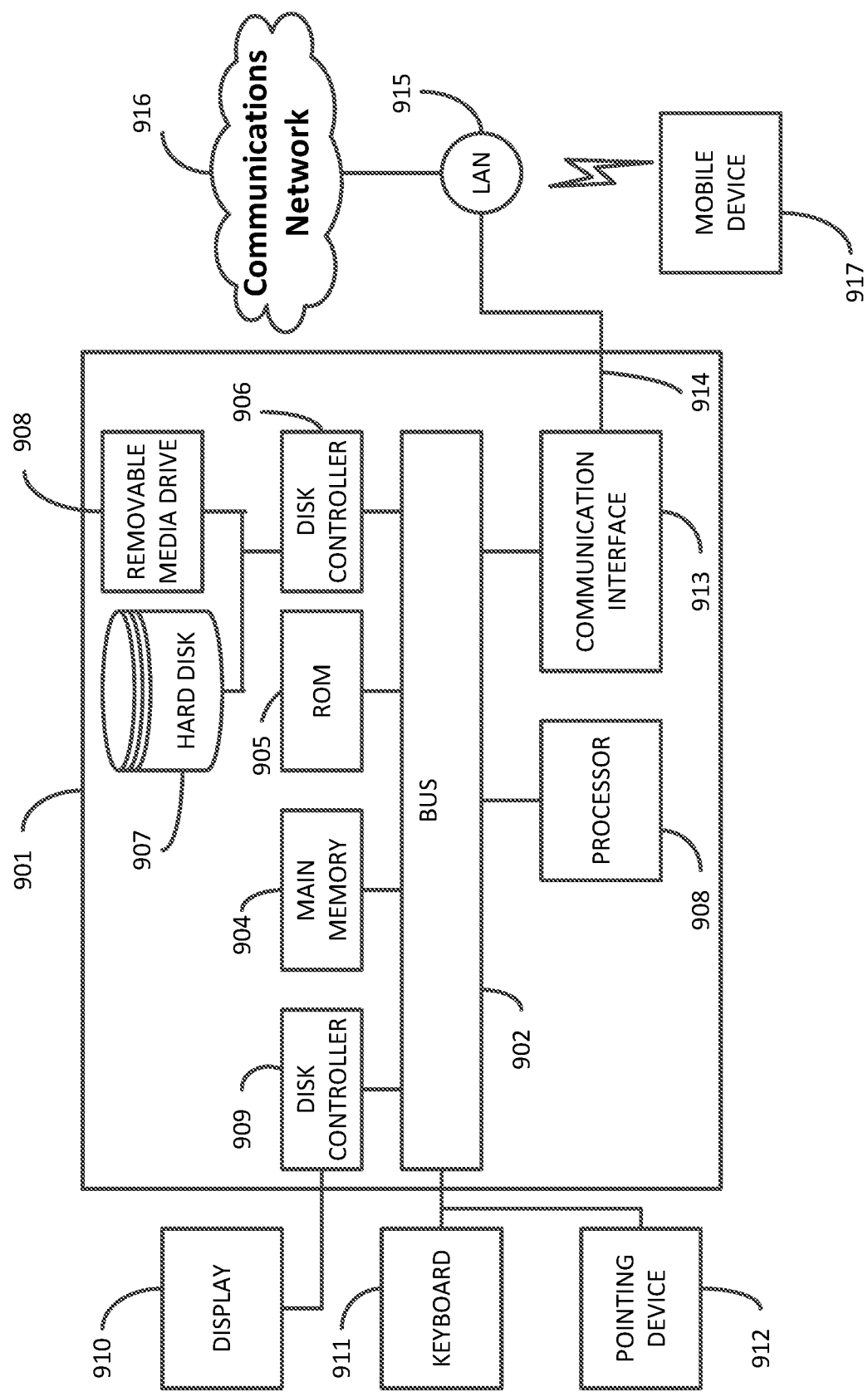
FIG. 9 is a block diagram of a computing device in accordance with an exemplary aspect of the disclosure.

The various features discussed above may be implemented by a computer system (or programmable logic). FIG. 9 illustrates such a computer system 901. In one embodiment, the computer system 901 is a particular, special-purpose machine when the processor 903 is programmed to perform placement of the bolt, aligning and positioning of a probe within the bolt and the like.

The computer system 901 includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, for displaying information to a computer user. The computer system includes input devices, such as a keyboard 911 and a pointing device 912, for interacting with a computer user and providing information to the processor 903. The pointing device 912, for example, may be a mouse, a trackball, a finger for a touch screen sensor, or a pointing stick for communicating direction information and command selections to the processor 903 and for controlling cursor movement on the display 910.

The processor 903 executes one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 901, for driving a device or devices for implementing the features of the present disclosure, and for enabling the computer system 901 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 903 for execution. A computer readable medium may take many forms, including but not limited to, non-volatile media or volatile media. Non-volatile media includes, for example, optical, magnetic disks, and magneto-optical disks, such as the hard disk 907 or the removable media drive 908. Volatile media includes dynamic memory, such as the main memory 904. Transmission media, on the contrary, includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 901 may receive the data on the telephone line and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an integrated services digital network (ISDN) card. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.).

The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein. It should be noted that, as used in the specification and the appended claims, the singular forms "a," "an," and "the" include plural referents unless the context clearly dictates otherwise.

The invention claimed is:

1. A method of generating a collision warning to a driver of a host vehicle, the method comprising:
   detecting, by the processing circuitry, existence of a slow remote vehicle ahead of the host vehicle;
   tracking, by the processing circuitry, speed of an immediately preceding vehicle ahead of the host vehicle;
   confirming, by the processing circuitry, that the slow remote vehicle is affecting the host vehicle's lane speed of traffic by detecting that the immediately preceding vehicle is decelerating;
   displaying, by the processing circuitry, when the slow remote vehicle is detected, and the immediately preceding vehicle is being tracked and is detected to be substantially maintaining a constant speed, an information message indicating the existence of the slow remote vehicle; and
   outputting, by the processing circuitry, when both the slow remote vehicle is detected and the immediately preceding vehicle is decelerating, the collision warning as an audio sound and a visual message.

2. The method according to claim 1, further comprising:
   establishing wireless communication with a remote vehicle;
   determining, by the processing circuitry based on information received via the wireless communication, whether the remote vehicle is on a same road as the host vehicle;
   determining, by the processing circuitry based on the information, whether the remote vehicle is on an exit ramp; and
   determining, when it is determined that the remote vehicle is on the same road and not on an exit ramp, whether the remote vehicle is slow.

3. The method according to claim 1, further comprising:
   determining, by the processing circuitry, whether track history of the remote vehicle is available;
   estimating, by the processing circuitry, geometry of a lane based on the track history of the remote vehicle; and
   determining, by the processing circuitry, whether a path obtained based on path history of the remote vehicle matches a predicted path of the host vehicle.

4. The method according to claim 3, further comprising:
   determining by the processing circuitry, when the track history of the remote vehicle is not available, the geometry of the lane based on a map.

5. The method according to claim 3, further comprising:
   determining a road type by performing, using the processing circuitry, scene identification,
   wherein the estimating the geometry of the lane based on the track history of the remote vehicle is performed when the road type is determined to be highway road type.

6. The method according to claim 3, wherein the estimating, by the processing circuitry, the geometry of the lane based on the track history of the remote vehicle is performed when the host vehicle is traveling greater than a predetermined speed.

7. The method according to claim 1, further comprising:
   establishing wireless communication with a plurality of remote vehicles; and
   searching, by the processing circuitry, among the plurality of remote vehicles, for slow relative-speed remote vehicles within a predetermined azimuth and having a heading which differs at most by a maximum heading difference from the host vehicle's heading, and are within a maximum range.

8. The method according to claim 7, wherein the difference from the host vehicle's heading is determined, by the processing circuitry, by comparing the heading of the remote vehicle to a combination of heading values, including: the host vehicle's current heading, the host vehicle's predicted heading, the preceding vehicle's heading at its current position, and the preceding vehicle's predicted heading.

9. The method according to claim 7, further comprising:
   confirming, by the processing circuitry, that the remote vehicle is on the host vehicle-road based on a determination that the preceding vehicle is slowing down, and another remote vehicle exists with a heading that is parallel to the slow remote vehicle's path up to the remote vehicle current position.

10. A method of generating a collision warning to a driver of a host vehicle, the method comprising:
    detecting, by the processing circuitry, existence of a slow remote vehicle ahead of the host vehicle;
    tracking, by the processing circuitry, speed of an immediately preceding vehicle ahead of the host vehicle;
    confirming, by the processing circuitry, that the slow remote vehicle is affecting the host vehicle's lane speed of traffic by detecting that the immediately preceding vehicle is decelerating
    displaying, by the processing circuitry, when the slow remote vehicle is detected and the immediately preceding vehicle is being tracked, an information message indicating the existence of the slow remote vehicle; and
    outputting, by the processing circuitry, when both the slow remote vehicle is detected and the immediately preceding vehicle is decelerating, the collision warning as an audio sound and a visual message, wherein the displaying, when the remote vehicle is slow, the information message indicating that the remote vehicle is slow every predetermined seconds.

11. A system for generating a collision warning to a driver of a host vehicle, the system comprising:
an on-board sensor of the host vehicle to track an immediately preceding vehicle;
wireless communication circuitry to establish wireless communication with a remote vehicle;
processing circuitry configured to
detect existence of a slow remote vehicle ahead of the host vehicle;
track speed of an immediately preceding vehicle ahead of the host vehicle;
confirm that the slow remote vehicle is affecting the host vehicle's lane speed of traffic by detecting that the immediately preceding vehicle is decelerating;
display, when the slow remote vehicle is detected, and the immediately preceding vehicle is being tracked and is detected to be substantially maintaining a constant speed, an information message indicating the existence of the slow remote vehicle; and
output, when both the slow remote vehicle is detected and the immediately preceding vehicle is decelerating, the collision warning as an audio sound and a visual message.

12. The system according to claim 11, wherein the processing circuitry is further configured to
establish wireless communication with a remote vehicle;
determine, by the processing circuitry based on information received via the wireless communication, whether the remote vehicle is on a same road as the host vehicle;
determine, by the processing circuitry based on the information, whether the remote vehicle is on an exit ramp; and
determine, when it is determined that the remote vehicle is on the same road and not on an exit ramp, whether the remote vehicle is slow.

13. The system according to claim 11, wherein the processing circuitry is further configured to
determine whether track history of the remote vehicle is available;
estimate geometry of a lane based on the track history of the remote vehicle; and
determine whether a path obtained based on path history of the remote vehicle matches a predicted path of the host vehicle.

14. The system according to claim 13, wherein the processing circuitry is further configured to
determine when the track history of the remote vehicle is not available, the geometry of the lane based on a map.

15. The system according to claim 13, wherein the processing circuitry is further configured to
determine a road type by performing, using the processing circuitry, scene identification,
wherein the estimating the geometry of the lane based on the track history of the remote vehicle is performed when the road type is determined to be highway road type.

16. The system according to claim 13, wherein the estimating, by the processing circuitry, the geometry of the lane based on the track history of the remote vehicle is performed when the host vehicle is traveling greater than a predetermined speed.

17. The system according to claim 11, wherein the processing circuitry is further configured to
establish wireless communication with a plurality of remote vehicles; and
search among the plurality of remote vehicles, for slow relative-speed remote vehicles within a predetermined azimuth and having a heading which differs at most by a maximum heading difference from the host vehicle's heading, and are within a maximum range.

18. The system according to claim 17, wherein the processing circuitry is further configured to determine the difference from the host vehicle's heading by comparing the heading of the remote vehicle to a combination of heading values, including: the host vehicle's current heading, the host vehicle's predicted heading, the preceding vehicle's heading at its current position, and the preceding vehicle's predicted heading.

19. The system according to claim 17, wherein the processing circuitry is further configured to confirm, that the remote vehicle is on the host vehicle-road based on a determination that the preceding vehicle is slowing down, and another remote vehicle exists with a heading that is parallel to the slow remote vehicle's path up to the remote vehicle current position.

20. The system according to claim 11, wherein the processing circuitry is further configured to display, when the remote vehicle is slow, the information message indicating that the remote vehicle is slow every predetermined seconds.

* * * * *